(12) United States Patent
Hauslage et al.

(10) Patent No.: US 9,255,021 B2
(45) Date of Patent: Feb. 9, 2016

(54) SYSTEM FOR THE METABOLIZATION OF ORGANIC SUBSTANCES AND METHOD FOR THE METABOLIZATION OF ORGANIC SUBSTANCES

(75) Inventors: Jens Hauslage, Bonn (DE); Kai Wasser, Grafschaft (DE)

(73) Assignee: Deutsches Zentrum für Luft-und Raumfahrt e.V., Cologne (DE)

(*) Notice: Subject to any disclaimer, the term of this patent is extended or adjusted under 35 U.S.C. 154(b) by 567 days.

(21) Appl. No.: 13/456,985

(22) Filed: Apr. 26, 2012

(65) Prior Publication Data

US 2012/0273411 A1 Nov. 1, 2012

(30) Foreign Application Priority Data

Apr. 29, 2011 (DE) .................... 10 2011 100 143

(51) Int. Cl.
| | | |
|---|---|---|
| *C02F 3/32* | (2006.01) | |
| *C02F 3/04* | (2006.01) | |
| *C02F 103/00* | (2006.01) | |

(52) U.S. Cl.
CPC . *C02F 3/327* (2013.01); *C02F 3/04* (2013.01); *C02F 2103/005* (2013.01); *Y02W 10/15* (2015.05); *Y02W 10/18* (2015.05)

(58) Field of Classification Search
CPC ...... C02F 3/327; C02F 3/04; C02F 2103/005; Y02W 10/15; Y02W 10/18
USPC ......... 210/602, 615, 616, 617, 631, 150, 151, 210/198.1, 220, 221.1, 221.2, 903
See application file for complete search history.

(56) References Cited

U.S. PATENT DOCUMENTS

| | | | | |
|---|---|---|---|---|
| 3,894,355 A | * | 7/1975 | Carothers | ........................ 47/48.5 |
| 4,218,318 A | * | 8/1980 | Niimi et al. | ................... 210/150 |
| 4,920,695 A | * | 5/1990 | Garden | .............................. 47/83 |
| 5,486,291 A | * | 1/1996 | Todd et al. | ..................... 210/602 |
| 5,599,443 A | * | 2/1997 | Yamasaki et al. | .............. 210/151 |

(Continued)

FOREIGN PATENT DOCUMENTS

| | | | |
|---|---|---|---|
| FR | 2913418 A1 | * | 9/2008 |
| WO | 9625366 A1 | | 8/1996 |
| WO | 2010108226 A1 | | 9/2010 |

OTHER PUBLICATIONS

"Aquaponics" last updated Jun. 6, 2010, available at http://www.brainright.com/Projects/Aquaponics/.

(Continued)

*Primary Examiner* — Fred Prince
(74) *Attorney, Agent, or Firm* — Maier & Maier, PLLC

(57) ABSTRACT

The present invention refers to a system for the metabolization of organic substances, comprising at least one housing with an elongated space. The housing has at least one inlet opening at the top end portion for the introduction of liquids with organic substances therein and at least one outlet opening for liquids at the bottom end portion. The inlet opening and the outlet opening are in communication with the elongated space, where the elongated space extends from the top end portion to the bottom end portion of the housing. Further, the system for metabolization comprises at least one planting opening provided on the housing between the inlet opening and the outlet opening for the accommodation of a support element for plants, the planting opening being in communication with the elongated space, and a porous filler material provided in the elongated space.

19 Claims, 1 Drawing Sheet

(56) References Cited

U.S. PATENT DOCUMENTS

| | | |
|---|---|---|
| 6,065,245 A | 5/2000 | Seawright |
| 6,843,910 B1 * | 1/2005 | Thomas .................. 210/167.01 |
| 7,510,649 B1 * | 3/2009 | Lavigne ....................... 210/151 |
| 2009/0211958 A1 | 8/2009 | Orsillo |
| 2009/0255179 A1 * | 10/2009 | Felknor .................. A01G 9/024 47/73 |
| 2009/0277829 A1 * | 11/2009 | He ................................. 210/602 |
| 2011/0127215 A1 * | 6/2011 | Gencer et al. ................. 210/617 |

OTHER PUBLICATIONS

European Search Report issued on Jan. 23, 2013 in corresponding European Patent Application No. 12 165 5330.7. 3 pages.

* cited by examiner

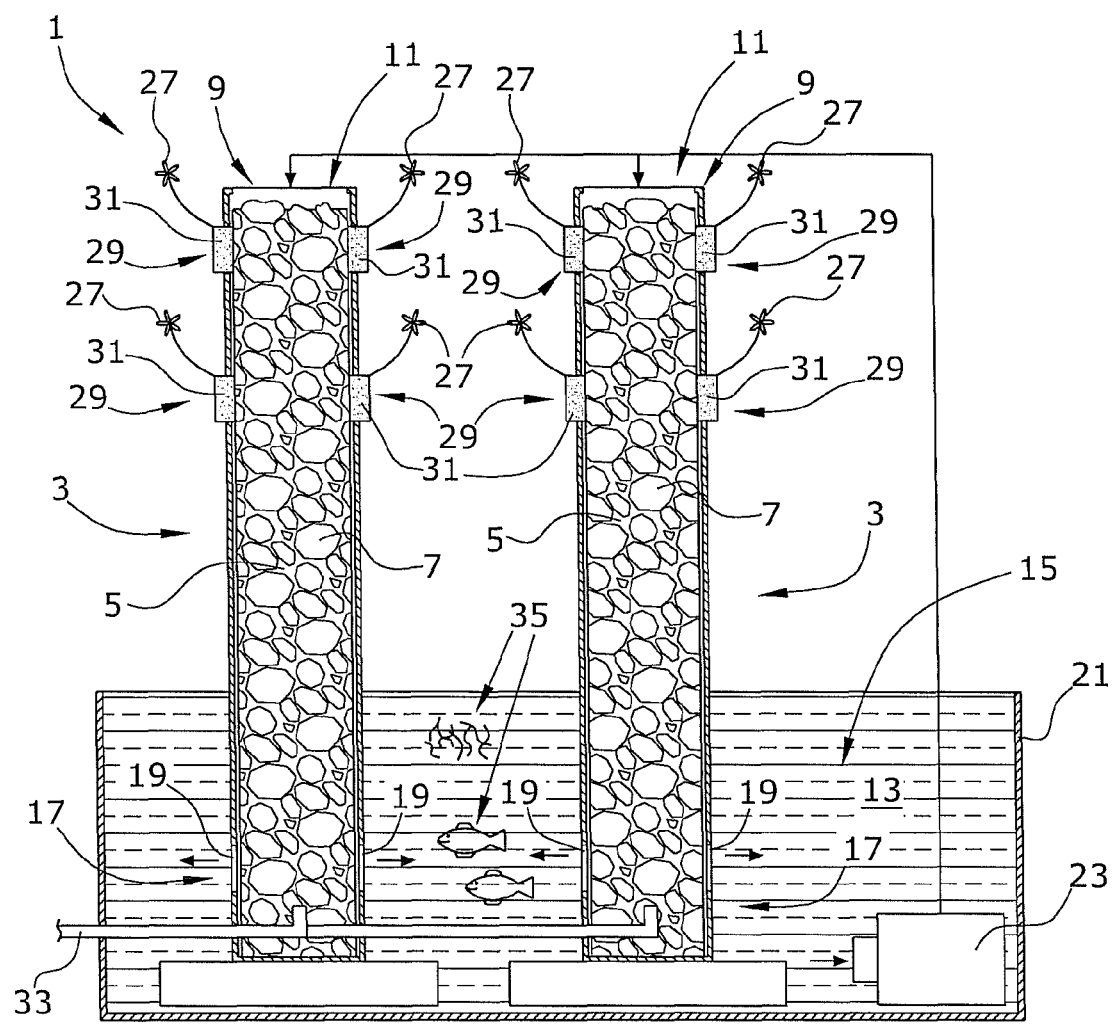

SYSTEM FOR THE METABOLIZATION OF ORGANIC SUBSTANCES AND METHOD FOR THE METABOLIZATION OF ORGANIC SUBSTANCES

RELATED APPLICATIONS

This application claims priority, under 35 U.S.C. §119, to German Patent Application No. DE 10 2011 100 143.7 filed Apr. 29, 2011, the disclosure of which is incorporated by reference herein in its entirety

BACKGROUND OF THE INVENTION

1. Field of the Invention

The present invention refers to a system and a method for the metabolization of organic substances.

2. Description of the Prior Art

Organic substances are often in the form of waste, such as kitchen waste or even urine, which are most often introduced into the normal waste or waste water cycle and are disposed of unused.

Often, organic waste is added to the residual waste, with the wet waste thus created posing problems to the waste management companies, since high-quality composite waste has to be supplied in waste incineration to keep the combustion process going.

In rural areas kitchen waste is often recycled in a composting process. In cities, however, such a possibility does not exist or is not desired because of unpleasant odors.

In creating bioregenerative life support systems it is also an object to recycle organic waste materials in a sensible manner.

SUMMARY OF THE INVENTION

It is an object of the invention to provide a method and a system which allow the recycling of organic waste in cities or in bioregenerative life support systems.

The object is achieved with the features of claims 1 and 12, respectively.

According to the invention a system for the metabolization of organic waste is provided with at least one housing in an elongated space, with the housing comprising at least one inlet opening in the top end portion for introducing liquids with organic substances and at least one outlet opening in the bottom end portion for liquids, wherein the inlet opening and the outlet opening are in communication with the elongated space, and wherein the elongated space extends from the top end portion to the bottom end portion of the housing. Between the at least one inlet opening and the at least one outlet opening, the housing is provided with at least one planting opening for accommodating a support element for plants, the planting opening being in communication with the elongated space. A porous filler material is provided in the elongated space. Preferably, the porous filler material is mineral. As an alternative, the porous filler material may also be a support material on a polymeric base.

With the system of the present invention, a sensible recycling of organic waste substances is possible in a particularly advantageous manner by introducing the organic waste substances with the liquid into the elongated space of the housing of the system of the present invention. A porous filler material is provided in the elongated space, which has a large surface due to its porosity. Microorganisms settle on this surface, which transform the organic substances. Because of the large surface, sufficiently large amounts of oxygen, e.g. from the air, can reach the microorganisms so that a substantially aerobic decomposition of the organic substances occurs. Thus, no unpleasant odors are produced in the process of the transformation of the organic substances. Microclimate zones can be formed in the pores of the filler material, where an anaerobic decomposition of those substances occurs that cannot be decomposed aerobically. Since this anaerobic decomposition occurs in microclimate zones, only small quantities of those gases are produced that are perceived as unpleasant odors, which gases are imperceptible on the whole and can further be bound by the liquid.

During the decomposition or transformation of organic substances nitrates are produced by the nitrification of microorganisms, which can be used as a nutrient source by plants accommodated in the planting openings on the housing, e.g. by means of support elements. For example, the nitrates are transported to the plants by the liquid.

Thus, the system of the present invention allows for a recycling of organic substances, such as waste material, by implementing the system of the invention for a transformation of the organic substances into nitrates that serve as plant nutrients. By transforming the organic substances without producing perceptible unpleasant odors, the system of the invention can be used in an advantageous manner even in cities, for example in living spaces.

By providing a mineral porous filler material, the pH in the system can be buffered and regulated.

Due to the fact that the housing comprises an elongated space, wherein the liquid and organic substances are introduced at the top end portion of the housing and are discharged at the bottom end portion of the housing, the liquid with the organic substances therein flows along a long path through the porous filling material so that organic substances can be decomposed in an efficient manner. The elongated space does not necessarily have to be vertical or be a linear elongated space. Of course, it is also possible to give the elongated space another shape as long as it is guaranteed that the liquid with the organic substances therein can flow in an appropriate manner through the porous filler material provided in the elongated space.

Preferably, it is provided that the porous filler material is volcanic stone and/or a clay mineral, with the filler material preferably coming as bulk material. Volcanic stone and/or a clay mineral, such as mineralized cat litter, has proven to be particularly advantageous in the system of the invention. Volcanic stone and most clay minerals are available at low prices and further have a large surface that in a particularly advantageous manner allows microorganisms to settle in large numbers. Moreover, by providing filler material in the form of bulk material a particularly large surface can be provided, and, in addition, a replacement of the filler material in the present system is thus guaranteed in an advantageous manner.

It may be provided that the porous filler material has a porosity between 35% and 70%. Here, porosity is understood as the ratio between the cavity volume and the overall volume.

Each planting opening may accommodate a support element for plants, where a support element preferably consists of rock wool or glass wool. Such support elements have proven to be particularly advantageous for plants, since the plant roots can penetrate such support elements in an advantageous manner and can extend into the elongated space in order to absorb the nitrate produced there by the microorganisms. The support element may also be made from a fiber material on a polymer basis.

The plant support element may be abiotic.

In an embodiment of the invention it is provided that the housing has its bottom end portion arranged in a liquid basin, where the outlet opening preferably opens into the liquid basin. In this context it may be provided that the at least one inlet opening is in communication with the liquid basin, where the liquid with the organic substances therein may be provided in the liquid basin.

By arranging the housing with the bottom end portion in a liquid basin, the liquid leaving the housing from the outlet opening can be collected in an advantageous manner. If the liquid with organic substances therein is arranged in the liquid basin, with the inlet opening being in communication with the liquid basin, a circulation can be formed by filling the liquid from the liquid basin into the inlet opening and the liquid flowing back into the liquid basin after having passed through the housing. In order to create a liquid with organic substances therein, organic substances or a liquid containing organic substances may be supplied to the liquid basin. The organic substances may be supplied as solids, a suspension or as a liquid.

Thus, the liquid basin may also serve as a reservoir for a liquid with organic substances therein and, thereby, as a buffer for the system. Moreover, aquatic life could exist in the liquid basin, such as vertebrates, invertebrates and/or plants such as algae.

The plants used could be fruit or vegetable plants, for instance, such as peppers, tomatoes or kitchen herbs. In this manner, the system of the invention can both provide fruit and vegetables and produce animal proteins in the form of fish, which is of particular advantage if the system of the invention is used in bioregenerative life support systems.

The aquatic life existing in the liquid basin may further assist in the decomposition or the transformation of the organic substances in that, for example, organic substances supplied to the liquid basin are eaten by the fish, while the excrements of the fish are decomposed by the system. Further, the system of the invention may also serve to purify air by absorbing $CO_2$ at the surface of the porous filling material and forming carbonic acid. This carbonic acid may be decomposed, by example, by the algae living in the liquid basin.

The system of the invention may be designed as an open system, for example, so that the above described purification of the air and the arrangement of plants produce oxygen for the environment.

In an embodiment of the invention it is provided that a liquid line and a pump are connected with the liquid basin via at least one inlet opening, the pump preferably being an immersion pump. Such an inventive structure allows for a simple directed guiding of the liquid with organic substances therein to the inlet opening. Since the organic substances are supplied to the liquid basin, where they dwell for a longer period of time, the organic substances in the form of solids and the liquid together form a suspension which can readily be transported to the inlet opening by means of the pump.

In a particularly preferred embodiment of the invention it is provided that a gas line is arranged in the bottom portion of the housing, through which an airflow can be introduced into the elongated space. Due to the additional introduction of air into the elongated space, the transformation or the decomposition of the organic substances can be made particularly effective.

The invention further provides a method for the metabolization of organic substances which is suited in particular for use in living spaces or bioregenerative life support systems. The method comprises the following steps:

producing a liquid with organic substances therein, introducing the liquid with organic substances therein into a top portion of an elongated space filled with porous filler material, wherein the liquid with organic substances therein flows through the porous filler material after it has been introduced, and wherein microorganisms transform the organic substances at least partly into nitrates, absorption of the nitrates by plants arranged in support elements, the support elements being in communication with the elongated space.

The method of the invention can be implemented in a particularly advantageous manner with the system described above. The method of the invention has the same advantages as described in the context of the system of the invention.

The method of the invention may provide that, after having passed through the porous filler material, the liquid is recirculated into the liquid with the organic substances therein. Thus, a liquid circuit is formed.

The liquid with the organic substances therein may be water with organic substances added thereto. By providing water as the liquid, the plants arranged in the support elements are supplied with the water required for their growth. At the same time, the liquid in the form of water supplies the plants with the nitrates produced during the transformation of the organic substances.

It may be provided that the liquid with the organic substances therein is produced in a liquid basin, with organic material being supplied as solid material or liquid. Aquatic life, preferably plants and/or fish, may exist in the liquid basin. If the existence of aquatic life is intended in the liquid basin, it is particularly advantageous if the liquid is water.

It may be provided that the liquid basin is irradiated with infrared light. In this manner, the growth of algae in the fluid basin is enhanced or accelerated.

An airflow can be produced in the porous filler material, which flows against the flow direction of the liquid with organic substances therein.

BRIEF DESCRIPTION OF THE DRAWINGS

FIG. 1 is a cross sectional view of the exemplary embodiment of the invention.

A full and enabling disclosure of the present invention including the best mode thereof, enabling one of ordinary skill in the art to carry out the invention, is set forth in greater detail in the following description, including reference to the accompanying drawing in which the sole FIGURE is a schematic illustration of a system 1 for the metabolization of organic substances according to the invention.

DESCRIPTION OF PREFERRED
EMBODIMENTS

The system 1 illustrated in the sole FIGURE comprises two housings 3 formed as hollow columns. The housings 3 each have an elongated space 5 inside. A porous filler material 7 is provided in the elongated space 5. The porous filler material 7 may be volcanic stone coming as a bulk material, for instance. In the top end portion 9 each housing has an inlet opening for the introduction of liquids 13 with organic substances 15 therein. At the bottom end portion 17 each housing 3 has two outlet openings 19 from which liquids can escape. The inlet opening 11 and the outlet openings 19 are thus each in communication with the elongated space 5 of the housing 3.

In the context of the present invention "in communication" refers to the existence of a fluid communication or a spatial communication.

The housings 3 are arranged vertically and stand with their bottom end portion in a liquid basin 21 which contains the liquid 13 with the organic substances 15 therein. The outlet openings 19 of the housings 3 open into the liquid basin 21.

The liquid 13 with organic substances 15 therein is produced in the liquid basin 21 by supplying organic substances 15 to the liquid 13 from outside as is illustrated in the FIGURE by an arrow. The organic substances may be in liquid or solid form, for example, and they may be kitchen waste or urine, for example. A liquid 13 with organic substances 15 therein is formed in the liquid basin 21, where the organic substances possibly being suspended in the liquid. Via a pump 23, which may be an immersion pump, for example, and a liquid line 25, the liquid 13 with organic substances 15 therein is pumped to the inlet opening 11 and thus supplied to the elongated space 5 of the housing 3. The liquid 13 with organic substances therein flows through the porous filler material 7. Due to the porosity, the filler material 17 has a large surface on which microorganisms can settle. The microorganisms decompose the organic substances or transform them. This is done in an aerobic process so that no unpleasant odors are formed. Substances in the organic substances 15 that cannot be aerobically decomposed can be anaerobically decomposed in microzones formed inside the pores of the filler material 7. In these anaerobic microzones only small amounts of gases are formed that produce unpleasant odors so that no perceptible unpleasant odors prevail in the vicinity of the system 1 of the invention.

During the decomposition or transformation of the organic substances nitrates are produced that can serve as nutrients for plants 27. To this effect, the housing 3 of the present system 1 has a plurality of planting openings 29 between the inlet opening 11 and the outlet opening 19, in which support elements 31 for the plants 27 are arranged. The planting openings 29 are in communication with the elongated space 5. The support elements 31 may be made from rock wool or glass wool and may be abiotic. Such support elements 31 have proven particularly advantageous, since in these support elements 31 the roots of the plants 27 can find a good hold, with the roots growing through the support elements into the elongated space. The liquid 13, which preferably is water, provides the plants 27 both with the necessary liquid and with nitrates that have been produced by the microorganisms and are transported to the plants 27 by the liquid 13. Here, the circulation system illustrated in the FIGURE is particularly advantageous, since the liquid 13 can also transport the nitrate produced by the microorganisms in the lower portion of the housing 3, e.g. in the lower end portion 17, to the plants 27 farther to the top by supplying the nitrate with the liquid 13 and the organic substances 15 to the inlet opening 11 via the pump 23 and the supply line 25.

A gas line 33 may be arranged in the lower end portion 17 of the housing 3, which supplies air to the elongated space 5, so that an airflow is produced in the elongated space 5. Due to the vertical orientation of the housing 3 the airflow rises in the elongated space 5 and produces a countercurrent to the liquid 13 with the organic substances 14 therein flowing through the porous filler material 7. This allows for a particularly efficient decomposition of the organic substances 15, the desired aerobic decomposition being enhanced in particular by the introduction of air.

In the liquid basin 21 aquatic life 35 such as plants, algae and/or fish may exist. These can contribute to the functions of the present system, if, for example, the fish eat a part of the organic substances 15 and excrete them as excrements that can be decomposed by the present system 1.

The present system 1 is designed as an open system. Using the present system, it is also possible to improve the air quality in the environment thereof, due to the plants 27 producing oxygen. At the same time, it is possible to absorb carbon dioxide at the surfaces of the porous filler material 7 and carbonic acid is produced that is decomposed by the algae so that further oxygen is produced.

The plants 27 may be fruit or vegetable plants like peppers, tomatoes or kitchen herbs.

The fish existing as aquatic life 35 in the liquid basin 21 may be edible fish. In this way, the system of the invention allows to obtain fruit and vegetables as well as animal proteins in the form of fish so that the organic substances supplied are recycled in a sensible manner.

In order to support the growth of algae in the liquid basin 21, for example, the liquid basin 21 may be irradiated with infrared light.

The liquid basin 21 also serves to buffer the system so that sufficient organic substances 15 are available in the system.

The present system 1 can be used as a relatively compact unit in living spaces. Of course, it is also possible to construct large facilities using the present system which can be used, for instance, in bioregenerative life support systems.

The system 1 of the invention as well as the above described method of the invention may contribute to the reduction of the waste produced in cities, e.g. by recycling organic substances such as kitchen waste. At the same time, a recycling of such organic substances is possible that allows the system 1 of the invention to be used also in bioregenerative life support systems.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A system for the metabolization of organic substances, comprising at least one housing with an elongated space,
   wherein the housing has at least one inlet opening at the top end portion for the introduction of liquids with organic substances therein and at least one outlet opening for liquids at the bottom end portion,
   wherein the inlet opening and the outlet opening are in communication with the elongated space, and
   wherein the elongated space extends from the top end portion to the bottom end portion of the housing,
   with at least one planting opening provided on the housing between the inlet opening at the top end portion and the outlet opening at the bottom end portion, a support element for plants is accommodated in the at least one planting opening, the planting opening being in communication with the elongated space, wherein each support element is configured to permit one or more plant roots to penetrate the support element and extend into the elongated space and
   with a porous filler material provided in the elongated space,
   wherein the housing is arranged with the bottom end portion in a liquid basin, the outlet opening into the liquid basin,
   wherein at least one inlet opening is in communication with the liquid basin, it being possible to arrange the liquid with organic substances therein in the liquid basin
   wherein a circulation of the liquids with organic substances is formed.

2. The system of claim 1, wherein the porous filler material is mineral.

3. The system of claim 2, wherein the porous filler material is volcanic stone and/or a clay mineral.

4. The system of claim 3, wherein the filler material is a bulk material.

5. The system of claim 1, wherein the porous filler material has a porosity between 35% and 70%.

6. The system of claim 1, wherein a plurality of planting openings is provided and that one support element for plants is accommodated in each planting opening.

7. The system of claim 6, wherein the support element for plants is abiotic.

8. The system of claim 6, wherein the support element is made from rock wool or glass wool.

9. The system of claim 1, wherein a liquid line and a pump connect the at least one inlet opening and the liquid basin.

10. The system of claim 9, wherein the pump being designed as an immersion pump.

11. The system of claim 1, wherein an air line is arranged in the bottom end portion of the housing, via which an airflow can be introduced into the elongated space.

12. The system of claim 1, wherein the system for the metabolization of organic substances is designed as an open system.

13. A method for the metabolization of organic substances in particular in living spaces or in bioregenerative life support systems, the method comprising the following steps:
   producing a liquid with organic substances therein,
   introducing the liquid with organic substances therein into a top portion of an elongated space filled with porous filler material,
   wherein the liquid with organic substances therein flows through the porous filler material after it has been introduced, and wherein microorganisms transform the organic substances at least partly into nitrates,
   absorption of the nitrates by plants arranged in support elements accommodated within a plurality of plant openings, the support elements being in communication with the elongated space and configured to permit one or more plant roots to penetrate the support elements and extend into the elongated space,
   wherein, after having flown through the porous filler material, the liquid is returned to the liquid with organic substances therein, whereby a liquid circuit is formed and the liquids transporting nitrates produced in a lower portion of the elongated space to the top portion of the elongated space.

14. The method of claim 13, wherein the liquid with organic substances therein is water with organic substances supplied thereto.

15. The method of claim 13, wherein the liquid with organic substances therein is produced in a liquid basin, with organic material being supplied in solid or liquid form.

16. The method of claim 15, wherein aquatic life exists in the liquid basin.

17. The method of claim 16, wherein the liquid basin is irradiated with infrared light.

18. The method of claim 16, wherein the aquatic life is algae and/or fish.

19. The method of claim 13, wherein an airflow is created in the porous filler material that flows in the direction opposite to the flow direction of the liquid with organic substances therein.

* * * * *